(12) United States Patent
Sage et al.

(10) Patent No.: US 6,392,387 B1
(45) Date of Patent: May 21, 2002

(54) PASSIVELY PROTECTED BATTERY PACK WITH ON LOAD CHARGE AND ON LOAD CONDITIONING-DISCHARGE CAPABILITY AND CHARGING SYSTEM

(75) Inventors: George E. Sage, Redmond; Jay A. Fuhr, Issaquah, both of WA (US)

(73) Assignee: Sage Electronics and Technology, Inc., Redmond, WA (US)

( * ) Notice: Subject to any disclaimer, the term of this patent is extended or adjusted under 35 U.S.C. 154(b) by 0 days.

(21) Appl. No.: 09/524,795

(22) Filed: Mar. 14, 2000

(51) Int. Cl.$^7$ .................................................. H02J 7/14
(52) U.S. Cl. ........................ 320/136; 320/162; 320/150
(58) Field of Search ................................ 320/128, 130, 320/131, 132, 134, 136, 139, 162, 150; 361/82, 84

(56) References Cited

U.S. PATENT DOCUMENTS

| | | | |
|---|---|---|---|
| 4,303,877 A | * 12/1981 | Meinhold | 320/6 |
| 4,709,202 A | * 11/1987 | Koenck et al. | 320/112 |
| 4,719,401 A | * 1/1988 | Altejd | 320/13 |
| 4,885,523 A | * 12/1989 | Koenck et al. | 320/132 |
| 5,035,964 A | * 7/1991 | Levinson et al. | 429/120 |
| 5,471,128 A | * 11/1995 | Patino et al. | 320/13 |
| 5,477,130 A | * 12/1995 | Hashimoto et al. | 320/49 |
| 5,576,610 A | * 11/1996 | Patino et al. | 320/31 |
| 5,710,505 A | * 1/1998 | Patino | 320/8 |
| 5,757,600 A | * 5/1998 | Kiraly | 361/84 |
| 5,831,415 A | * 11/1998 | Rudolph et al. | 320/112 |
| 5,883,495 A | * 3/1999 | Smith et al. | 320/128 |
| 5,896,025 A | * 4/1999 | Yamaguchi et al. | 320/134 |
| 5,920,181 A | * 7/1999 | Alberkrack et al. | 320/146 |
| 5,945,809 A | 8/1999 | Inaba et al. | 320/134 |
| 5,963,019 A | 10/1999 | Cheon | 320/150 |
| 6,013,388 A | 1/2000 | Stadnick et al. | 429/120 |

\* cited by examiner

*Primary Examiner*—Gregory J. Toatley, Jr.

(57) ABSTRACT

A new type of passive battery pack short circuit protection is provided in a battery pack consisting of one or more battery cells, with on load charge and on load conditioning-discharge capability, having a minimum of only 2 terminals. At least one voltage clamping device is included in the charge path of the battery to provide both charge and conditioning-discharge capability. A charging system provides both charging and discharging controls so that current can be either charged to or discharged from the battery through the voltage clamping device. The breakdown voltage of the voltage clamping device is selected to be equal to or greater than the maximum battery voltage, thus providing short circuit protection of the battery pack while still allowing a discharge function with a minimum of 2 terminals. The charging system provides a positive charge current to charge the battery through the voltage clamping device and a negative voltage potential equal to or greater than the reverse breakdown voltage of the voltage clamping device, in conjunction with a current control, to discharge the battery.

46 Claims, 11 Drawing Sheets

PASSIVELY PROTECTED BATTERY PACK WITH ON LOAD CHARGE AND ON LOAD CONDITIONING-DISCHARGE CAPABILITY AND CHARGING SYSTEM

FIELD OF THE INVENTION

The present invention generally relates to battery packs and battery charging systems.

BACKGROUND AND OVERVIEW OF THE INVENTION

Battery packs consist of a plurality of electrochemical devices. Electrochemical devices comprise such devices as rechargeable batteries, fuel cells, double layer capacitors, and a hybrid battery containing fuel cell electrode and electrochemical supercapacitors. Battery cells are electrochemical devices that store energy in chemical form. A rechargeable battery cell is capable of storing electrical charge in the form of a reversible chemical reaction. When the battery cell is subsequently placed across a load, this reaction reverses from the direction in the storage mode, thereby producing electrical energy for use by the load. Rechargeable battery packs, also known as secondary batteries, are widely used as a power source for many devices. The number and type of electrochemical devices comprising the battery pack determines the power rating of a battery pack. A battery pack may consist of rechargeable battery cells in series, in parallel, or in series and parallel. To obtain a battery pack consisting of rechargeable battery cells which has a higher voltage than a single cell's voltage, typically a plurality of cells are placed in series, while to obtain a battery pack that has a higher capacity than a single cell's storage capacity, typically a plurality of cells are placed in parallel.

Those skilled in the art understand battery cell life and performance can be enhanced with battery cell conditioning. Battery cell conditioning occurs when the battery cell is discharged in a predetermined sequence in relationship to the recharging of the battery cell. Prior art further teaches us the benefits of pulse charging and discharging. U.S. Pat. No. 5,633,574 entitled "Pulse charge Battery Charger", issued to Sage on May 27, 1997 provides enhanced battery conditioning capability with pulse charging and discharging, and is hereby incorporated by reference. In order to accomplish the discharge pulse for battery pack conditioning, current from the battery pack must flow in the reverse direction, that is, from the battery pack to a load included in the battery charger. However, not all battery packs are capable of allowing a discharge pulse through all of their terminals.

Battery packs may include short circuit battery terminal protection preventing a conditioning reverse current flow from occurring through these terminals. Unprotected battery terminals may themselves come in contact with foreign objects, which can cause a battery pack to short circuit, spark, or cause the terminals to overheat. To deal with this problem, battery packs may include two sets of terminals or connectors, one unprotected operatively accessible by the battery powered device and one set of terminals accessible to an external power source for battery charging. This external set of charging terminals may be short circuit protected or unprotected. Alternatively, battery packs with two sets of terminals can be located within the battery powered device, with one set of terminals operatively coupled to or positioned adjacent to a set of terminals located in the housing of the device, which are themselves accessible to an external power source for battery charging.

The present start of the art for passively protecting battery pack terminals from an externally induced short circuit uses a conventional blocking diode operatively coupled to the battery terminals. However, the conventional blocking diode conducts current in only one direction, thereby preventing the discharging of the battery pack through these terminals. This type of battery pack protection requires a battery charging system using a discharging means for conditioning of battery packs to be operatively coupled to a set of unprotected battery pack terminals or connectors, therefore requiring the removal of the battery pack with protected external terminals from the battery powered device to expose the unprotected terminals or connectors and then, once removed from the device, further requiring the user to operatively couple the battery pack to the battery charging system. These charging systems require the user to take the time to execute this operation, and take more time to replace the battery pack on the battery powered device once battery charging and conditioning is completed, thereby adding to the total labor time and costs associated with using battery powered devices and in the case of emergency personnel such as firefighters, adding to their overall emergency response time as well.

Prior art has addressed the lack of discharge capability of the conventional blocking diode passively protected battery pack by adding an active means of "turning on" and "turning off" an electronic device included in the charge path of the battery pack. "U.S. Pat. No. 5,710,505" shows us a battery pack with short circuit protection which allows both charging and discharging. "U.S. Pat. No. 5,710,505" uses a Triac device in the charge path of a battery pack and operationally requires a battery pack with a minimum of three terminals. The Triac device, when actively "turned on", allows the conduction of current through the device. However, a limitation of a Triac device is that once the device is in an "on state", that is, conductive, the current through the device must be interrupted, or drop below a minimum holding current, to restore the non-conductive "off state" condition, thereby restoring the short circuit protection. Therefore, unless the current in "U.S. Pat. No. 5,710,505" is reduced to the minimum level or completely interrupted, the reverse current non-conductive battery short circuit protection will not be restored. This same operational limitation which applies to a triac device likewise applies to a Thyristor. Field Effect Transistors (FETs) and Metal Oxide FETs (MOSFETs) devices also must be "turned on" to conduct current, but then must be actively "turned off" to restore the non-conductive state, thereby restoring the battery pack short circuit protection.

In addition to devices such as Triacs and Thyristors, current flow can also be controlled using voltage clamping devices, which include but are not limited to, Zeners, Transient Voltage Suppressors (TVS), and Metal Oxide Varistors (MOV). Voltage clamping devices have a reverse voltage breakdown threshold; that is, allowing the conduction of a reverse current flow without restriction through the voltage clamping device, given enough reverse voltage is applied, then automatically restoring to a non-conducting mode when the voltage drops below the breakdown threshold. Depending on operating conditions, the breakdown threshold of the voltage clamping device may be due to an avalanche type junction breakdown or a tunneling type junction breakdown or a combination of both. This voltage breakdown threshold is a well-defined reproducible operating characteristic of the device. The classic voltage-current interrelationship diagram for voltage clamping devices is depicted in FIG. 4 of the accompanying drawings.

Each voltage clamping device will have an optimum operating voltage range and will exhibit predictable operating variations such as reaction time, variation in reverse current leakage, and variations in device failure mode and device failure frequency. The useful life of the voltage clamping device in the battery pack is dependent on the correct voltage clamping device selection for the specific battery pack application. Voltage clamping devices are further characterized by specifying the maximum clamping voltage at the maximum reverse current rating. Silicon voltage clamping devices incorporating a larger junction cross section are also known as Transient Voltage Suppressors (TVS) and will survive a large number of reverse current draws, given the appropriate operational environment.

The overall useful life, that is, survival capability under a particular load for a specific time period, of the voltage clamping device can be maximized with the careful determination of the applications' operating conditions and the operating performance of the specific voltage clamping device in those conditions. Operating parameters such as the voltage, current flow and periodicity of the transient voltage event must be considered. The voltage clamping device operating characteristics can be further enhanced when used in parallel or in series with each other and with other electronic components, comprising but not limited to Schottky diodes, conventional blocking diodes and conventional resistors.

Temperature is another key operating variable to consider when selecting a voltage clamping device for the specific battery pack application. Heat within the battery pack can result from excessive ambient temperature, battery cell self heating and voltage clamping device self heating effects from applied power. Junction performance of a voltage clamping device will vary in relation to temperature, with excessive heating directly impacting the voltage clamping device useful life. Therefore, for a given operating application, performance and useful life of the voltage clamping device can be enhanced, if exposure to excessive operating temperature is avoided. Those skilled in the art understand that battery cell life and therefore battery pack life will likewise be enhanced if exposure to excessive operating temperature is avoided.

Potential exposure to excessively high temperature during the operation of the battery pack can be minimized by the addition of a means to detect temperature in its operating environment by providing a means for obtaining operating temperature feedback information. Furthermore, it can be expected that the heat generated by operating various electronic and electrochemical devices in the battery pack internal environment will not be the same due to differences in device operating characteristics, manufacturing differences between similar devices, and age differences of similar devices. Within a battery pack, these differences in thermal characteristics will result in a heterogeneous distribution of temperature gradients within the battery pack internal environment during battery pack charging and discharge, therefore potentially distorting available battery pack temperature information and the available device specific temperature information. Battery pack internal temperature information errors may also occur from the imperfect contact between the temperature detection means and the material requiring temperature measurement.

Differences in temperature gradients can be passively compensated in part by the thermal conductivity of the specific electronic components themselves as well as their surrounding environment; in the case of a battery pack air surrounding the battery cell and battery cell to battery cell contact. In effect, one battery cell may act as a heat sink for its neighbor. Additionally, a heat generating electronic component may be passively protected from excessive heat and/or thermal gradients in an electronic device passively protected by the use of a "heat pipe" type of component, where heat is transferred from a heat source to a heat sink. These thermal gradients can be reduced from general or specific areas within the electronic device. Heat pipes are vacuum tight vessels that rely on a continuous cycle where liquid evaporation occurs at the heat source, thereby absorbing thermal energy, with the resultant higher pressure vapor traveling to the heat sink, and where condensation at the cooler heat sink end then occurs, thereby releasing the thermal energy absorbed at the heat source. The condensed fluid within the heat pipe is then returned to the heat source area by capillary action. Therefore, a heat pipe is a passive means to protect, to the capacity of the heat pipe, from excessive heating of components within an electronic device. Heat pipes may be operatively coupled to the heat generating components of a system or located proximate to the heat generating components using air or other gas medium as an intermediate thermal conductor.

SUMMARY OF INVENTION

This summary of invention provides a reference to the various embodiments of the passively protected battery pack with on load charge and on load conditioning-discharge capability and charging system. Accordingly, improved battery pack protection with on load charge and discharge capability has been provided, which can be incorporated into a charging system with a minimum number of only 2 terminals. The ability to provide a passively protected on load charge and on load conditioning-discharge capable battery pack with charging system will be a significant time saver to those individuals who work with the system by eliminating the need of removing the battery pack from the battery powered device to charge and conditioning-discharge, while the short circuit safety of the individual and the battery pack is maintained at all times at the passively protected terminals. Further, the passively protected battery back with on load and on load conditioning-discharge capability will be an enhancement to the overall charging system because of improved mechanical integrity, ease of manufacturing, lower component count and lower associated production costs.

While the summary of the passively protected battery pack with on load charge and on load conditioning-discharge capability has been described in connection with what is presently considered to be the most practical and preferred embodiments, it is to be understood that the passively protected battery pack with on load charge and on load conditioning-discharge capability is not to be limited to the disclosed embodiments. On the contrary, is intended to cover various modifications and equivalent arrangements included within the spirit and scope of the appended claims. Passively Protected Battery Pack with On Load Charge and On Load Conditioning-Discharge Capability and Charging System The object of the passively protected battery pack with on load charge and on load conditioning-discharge capability and charging system is to provide a passive means of protecting a battery pack with a plurality of battery cells from an externally induced short circuit of the battery pack with a minimum of 2 terminals. A battery pack may still be connected to a load such as a cellular phone, while the battery cells are being charged or discharged with at least the battery pack external terminals passively protected from a damaging short circuit occurring at any time. How a battery is protected, and how the battery is charged, in one embodiment centers on a protective means, also referred to one voltage clamping device, in the charge path of the battery pack, which in this embodiment is a silicon transient voltage suppressor. The appropriate operating value of at least one voltage clamping device is selected for the battery pack, given the battery pack voltage, battery pack amperage and environmental operating conditions.

It would be highly desirable to have a battery pack with short circuit protection and a charger system capable of providing both charging and discharging capabilities through a reduced number of terminals, the minimum number being 2. Reducing the number of terminals required in a charging system while still providing passively maintained short circuit protection for the battery pack and its cells, while at the same time providing both on load charging and on load conditioning-discharging capability, would be an enhancement to the overall charging system in terms of providing the capability of conditioning the battery pack while the battery is still connected to the battery powered device. A 2 terminal passively protected battery capable of providing both on load charging and on load conditioning-discharging capability would further be an enhancement to the overall charging system because of the improved mechanical integrity, safety, ease of manufacturing, lower component count and lower associated production costs.

Passively Protected Battery Pack with On Load Charge and On Load Conditioning-Discharge Capability with Charge Only Battery Charging System The object of the passively protected battery pack with on load charge and on load conditioning-discharge capability is to provide a passive means of protecting a battery pack from an externally induced short circuit and to provide both charge and discharge capability while requiring only 2 terminals. This is accomplished by utilizing at least one voltage clamping device in the charge path of the battery pack.

Because of the improved mechanical integrity, safety, ease of manufacturing, and lower component count and costs, it would also be highly desirable to have a short circuit protected battery pack with a reduced number of terminals, the minimum number being 2, that could be charged using a battery pack charger even though the charger lacked the ability to condition-discharge the battery by use of a discharge feature.

Passively Protected Battery Pack With On Load Charge and On Load Conditioning-Discharge Capability and Pulse Charging System In a further embodiment of the passively protected battery pack with on load charge and on load conditioning-discharge capability, a pulse charging and discharging means is added within the battery charger system for enhanced conditioning of the battery cells in the battery pack. By utilizing the voltage clamping device in the charge path of the battery pack, this eliminates the need for removing the battery pack from the battery powered devices for enhanced pack conditioning, comprising, but not limited to, cellular phones, two way radios, portable power tools and other battery powered devices, thereby further extending battery cell useful life, improving battery pack life, improving mechanical integrity, safety, ease of use, and reducing labor time and labor costs associated in removing and replacing battery packs from battery powered devices for enhanced battery cell conditioning.

Passively Protected Battery Pack with On Device Charge and Conditioning-Discharge Capability With Enhanced Operating Characteristics and Charging System By means of a further embodiment of the passively protected battery pack with on load charge and on load conditioning-discharge capability, the operating characteristics of the voltage clamping device in the charge path of the battery are enhanced by means of additionally including at least one resistor in the charge path of the battery to limit current flow through the voltage clamping device, thereby enhancing the voltage clamping device survival rate in the battery pack, and thereby improving the battery pack survival rate by protecting it from an accidental excessively high charging current or excessively high conditioning discharging current operating event.

By means of a further embodiment of the passively protected battery pack with on load charge and on load conditioning-discharge capability, the operating characteristics of the voltage clamping device in the charge path of the battery are enhanced by means of additionally including at least one conventional blocking diode in parallel with the voltage clamping device in the charge path of the battery, thereby enhancing the voltage clamping device failure characteristic by continuing to provide a charge current path to the battery cells from the battery pack charging system in the event of an operational failure of the voltage clamping device, thereby enhancing the useful life of the battery pack.

By means of a further embodiment of the passively protected battery pack with on load charge and on load conditioning-discharge capability, the operating useful life of the voltage clamping device in the charge path of the battery is enhanced by means of additionally including at least one Schottky diode in parallel with the voltage clamping device in the charge path of the battery. The Schottky diode forward voltage characteristic is less than that of the voltage clamping device and therefore the charging current will flow with a preference through the Schottky diode, thereby reducing the forward current stress on the voltage clamping device, thereby enhancing the useful life of the voltage clamping device, thereby enhancing the useful life of the battery pack.

Passively Protected Battery Pack with On Load Charge and On Load Conditioning-Discharge Capability With Enhanced Internal Battery Pack Information and Charging System By means of a further embodiment of the passively protected battery pack with on load charge and on load conditioning-discharge capability, a detection means is added within the battery pack for detecting a temperature within the battery pack, and a temperature detection terminal that transmits temperature information indicating the temperature detected by the temperature detection means to the charging/discharging device, thereby enhancing the available internal battery pack information to the battery pack charging system.

By means of a further embodiment of the passively protected battery pack with on load charge and on load conditioning-discharge capability, a temperature detection means is added within the battery pack which is operatively coupled to thermally conductive material located adjacent to a plurality of battery cells for detecting a temperature within the battery pack, and a temperature detection terminal that transmits temperature information indicating the temperature detected by the temperature detection means to the charging/discharging device. The thermally conductive materials will passively modify the temperature information that is collected by the temperature detection means according to the thermal characteristics of the material such as its thermal conductivity, thereby enhancing the available internal battery pack information to the battery pack charging system.

Passively Protected Battery Pack with On Load Charge and On Load Conditioning-Discharge Capability with Enhanced Internal Passive Thermal Protection and Battery Pack Information and Charging System By means of a further embodiment of the passively protected battery pack with on load charge and on load conditioning-discharge capability, a passive thermal protection means, in this case, at least one heat pipe, is added within the battery pack for passively protecting the voltage clamping device from excessive heating events and for minimizing the temperature gradients within the battery pack during battery pack cell charging and battery cell conditioning-discharging, thereby enhancing the operating conditions of the voltage clamping device within the battery pack and thereby the overall useful life of the voltage clamping device, as well as the overall battery pack life.

By means of a further embodiment of the passively protected battery pack with on load charge and on load conditioning-discharge capability, a passive thermal protection means, in this case, at least one heat pipe, is used in combination with a temperature detection means added within the battery pack for detecting a temperature within the battery pack, and a temperature detection terminal that transmits temperature information indicating the temperature detected by the temperature detection means to the charging/discharging device, thereby enhancing operating conditions of the voltage clamping device within the battery pack and the available internal battery pack temperature information.

Those skilled in the art will understand by virtue of the improved mechanical safety that it would be highly desirable to have a battery pack with a passive thermal protection means, in this case at least one heat pipe, even if the charging system lacked the ability to condition-discharge the battery by use of a discharge feature.

Passively Protected Battery Pack With On Device Charge and Conditioning-Discharge Capability With External Passive Protection Placement By means of a further embodiment of the passively protected battery pack with on load charge and on load conditioning-discharge capability, where the battery pack with multiple sets of terminals is located within the battery powered device, where one set of terminals, whether passively protected or unprotected is operatively coupled to or positioned adjacent to a set of terminals located in the housing of the battery powered device, which are themselves passively protected with at least one voltage clamping device in the charge path of the battery pack and which battery housing terminals themselves are accessible to an external power source for battery charging, thereby enhancing passive protection of the battery pack located in the battery operated device at all times, enhancing the ease of manufacturing, thereby lowering associated production costs and providing enhanced safety.

Passively Protected Battery Pack With On Load Charge and On Load Conditioning-Discharge Capability Consisting of a Plurality of Electrochemical Devices and Charging System By means of a further embodiment of the passively protected battery pack with on load charge and on load conditioning-discharge capability and charging system, a plurality of electrochemical devices comprising such devices as rechargeable batteries, fuel cells, double layer capacitors, and a hybrid battery containing fuel cell electrode and electrochemical supercapacitors are included within the battery pack for enhancing the charge and discharge operating characteristics of the overall battery pack.

The benefits of the passively protected battery pack consisting of a plurality of electrochemical devices and charging system with a reduced number of terminals, the minimum number being 2, are improved mechanical integrity, enhanced pack safety from short circuits, and lower component count and lower costs.

BRIEF DESCRIPTION OF THE DRAWINGS

The passively protected battery pack with on load charge and on load conditioning-discharge capability and charging system is illustrated in the drawings wherein.

DETAILED DESCRIPTION OF THE PREFERRED EMBODIMENT

Introduction

A passively protected battery, per se, or passively protected battery pack of battery cells either in series or in parallel, and a respective charging system together provide for charging and conditioning discharging of the battery, while the battery remains positioned with a load, such as a cellular telephone. Moreover, the passively protected battery terminals, whether the battery pack is removed from the load, still with the load, or being charged are always protected from any destructive short circuit. Moreover, the passively protected battery has a set of positive and negative terminals for contacting the load or contacting the charger, and an additional set of just positive and negative terminals for contacting the charger. The protective means referred to is comprised of at least one voltage clamping device, which in this case, is a transient voltage suppressor.

PASSIVELY PROTECTED BATTERY PACK WITH ON LOAD CHARGE AND ON LOAD CONDITIONING-DISCHARGE CAPABILITY AND CHARGING SYSTEM

Figure 1:
FIG. 1 depicts the new type of passively protected battery pack with on load charge and on load conditioning-discharge capability shown operatively coupled to a load, in this case a cellular phone, while the battery pack is being charged.

In FIG. 1, the exteriors are shown of a selected load, in this case, a cellular telephone, a charger, in this case a multi-cavity charger, a passively protected battery pack with on load charge and on load conditioning-discharge capability and a battery charger.

Figure 2:
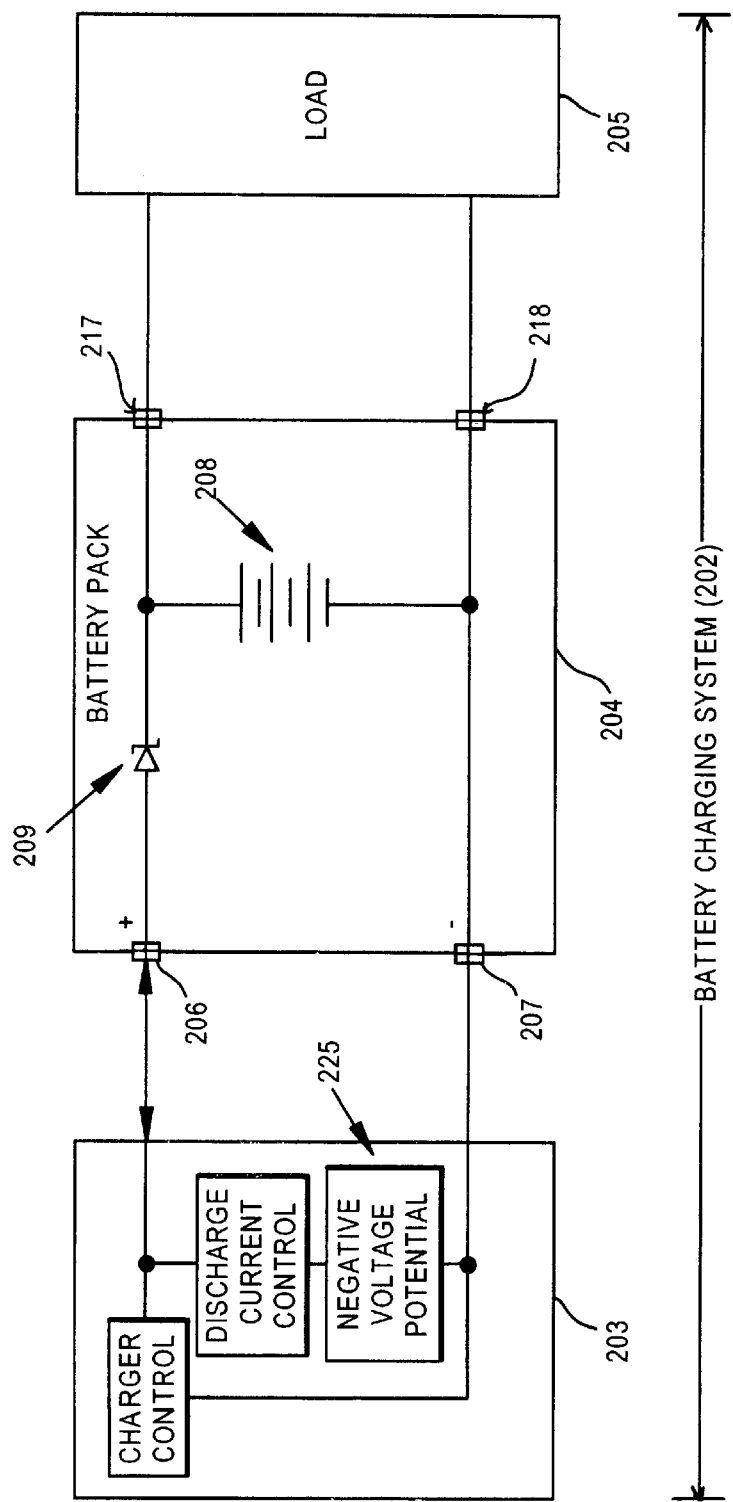
FIG. 2 is a functional block diagram of a bi-directional current control circuit suitable for use in controlling the charging and conditioning discharging of the passively protected battery pack with on load charge and on load conditioning-discharge capability having a built in protective means to prevent the short circuit of the battery pack terminals when the battery is connected to the load, or when the battery is removed from the load, the battery pack terminals are always protected from a destructive short circuit by the protective means generally referred to as a voltage clamping device, which in FIG. 2 is shown as a transient voltage suppressor in accordance with one embodiment of the passively protected battery pack with on load charge and on load conditioning-discharge capability.

Referring to FIG. 2 there is shown a system (202) in accordance with the passively protected battery pack with on load charge and on load conditioning-discharge capability. The system (202) comprises a charger (203), battery pack (204), and battery powered device load (205). In accordance with the passively protected battery pack with on load charge and on load conditioning-discharge capability, a two terminal battery (204) is provided with both charging and discharging capability. Battery pack (204) has a positive and negative charge terminal (206) and (207) respectively, and a positive and negative load terminal (217) and (218) respective!,, and battery cells (208) operatively coupled between the positive and negative charge terminals. In accordance with the passively protected battery pack with on load charge and on load conditioning-discharge capability, the battery pack (204) further includes at least one voltage clamping device, in this case a transient voltage suppressor, (209) which has been carefully selected for conducting current to and discharging current from the battery pack (204). The on load discharge conditioning capability of the system (202) is provided by a negative voltage potential (225) in conjunction with the discharge current control. The voltage clamping device in this case a transient voltage suppressor, (209) selection process considers application specifications of the pack, such as the voltage of the battery pack, the type and variety of battery cells (208) contained within the pack (204), the operating status of the load, the charge cycle time parameter for the battery pack and conditioning-discharge cycle time parameter for the battery pack. The charger (203) selected on load charge voltage and conditioning-discharge voltage control settings are compensated for the type, number, and rating of voltage clamping device. Likewise, the charger (203) on load charge current and conditioning-discharge current control sewing selection considers such application parameters as the operating status of the load during charging and discharging, the charge and discharge cycle time requirement for the battery pack (204), and the battery pack (204) overall capacity. The voltage clamping device, in this case, a transient voltage suppressor, (209) does not require a current flow reduction or termination to restore its non-conductive state.

In accordance with the passively protected battery pack with on load charge and on load conditioning-discharge capability, the system (202) allows the charger (203) to be both a charger and a conditioner. Conditioning occurs when the battery pack (204) is discharged and recharged according to a specific pre-programmed algorithm. The use of the voltage clamping device, in this case a transient voltage suppressor, (209) within the charge path of the battery pack (204) allows a two charging terminal battery, (206) and (207) respectively to incorporate passive battery short circuit protection and provides both on load charge and on load conditioning-discharge capabilities. The two terminal schema described by the passively protected battery pack with on load charge and on load conditioning-discharge capability provides the advantage of a minimum of 2 terminals with increased capability and functionality. While shown with a battery power device, the battery powered device is not required in the charging or discharging of the battery.

PASSIVELY PROTECTED BATTERY PACK WITH ON LOAD CHARGE AND ON LOAD CONDITIONING-DISCHARGE CAPABILITY AND PULSE CHARGING SYSTEM

Figure 3:
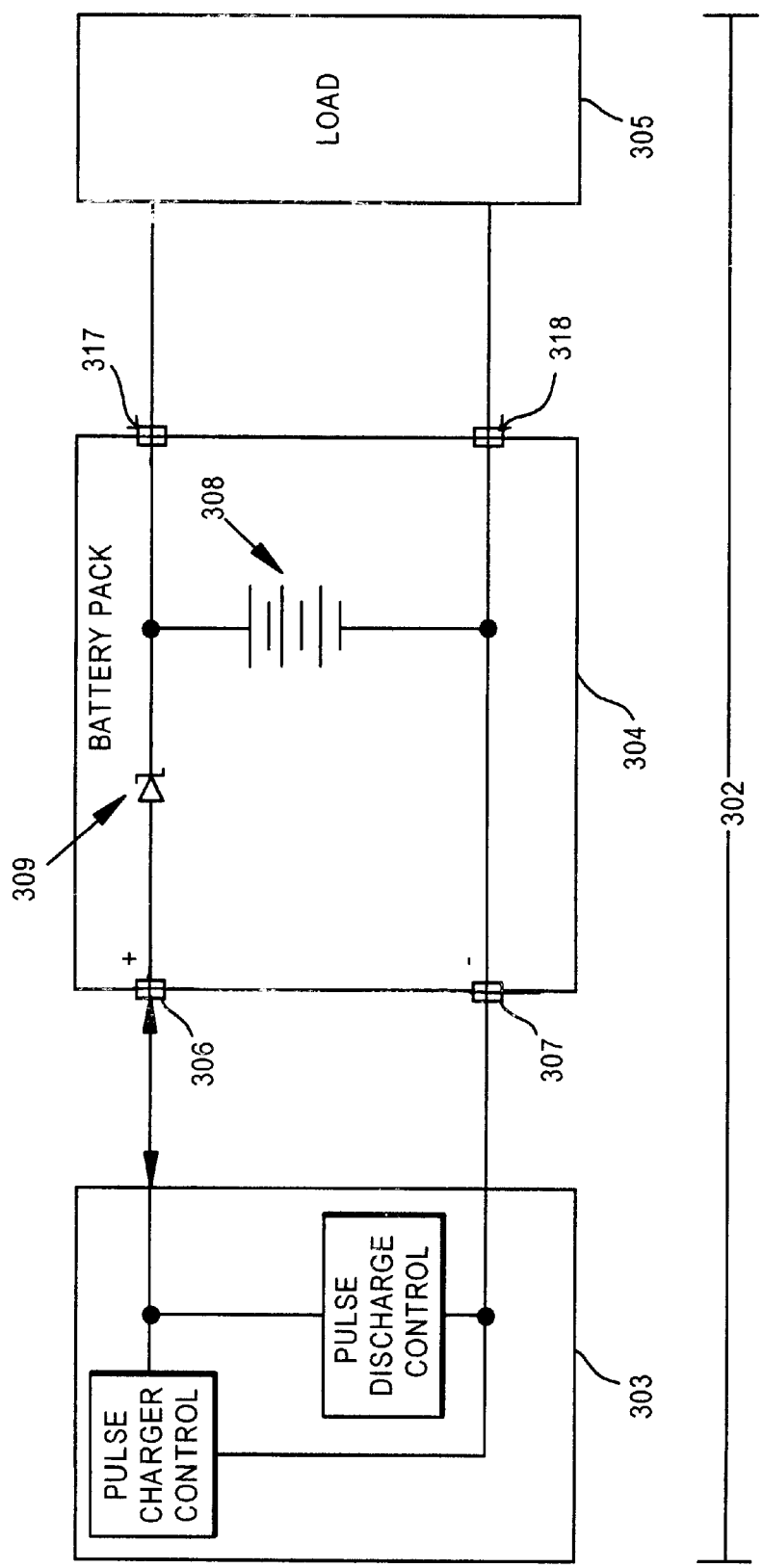
FIG. 3 is a functional block diagram of a bi-directional current control circuit which is similar to FIG. 2, however, suitable for use in controlling the pulse charging and conditioning discharging of the passively protected battery pack with on load charge and on load conditioning-discharge capability having built in protective means to prevent the short circuit of the battery pack terminals when the battery is connected to the load, or when the battery is removed from the load, the battery pack terminals are always protected from a destructive short circuit by the protective means generally referred to as a voltage clamping device, which in FIG. 3 is shown as a transient voltage suppressor in accordance with one embodiment of the passively protected battery pack with on load charge and on load conditioning-discharge capability.
Figure 4:
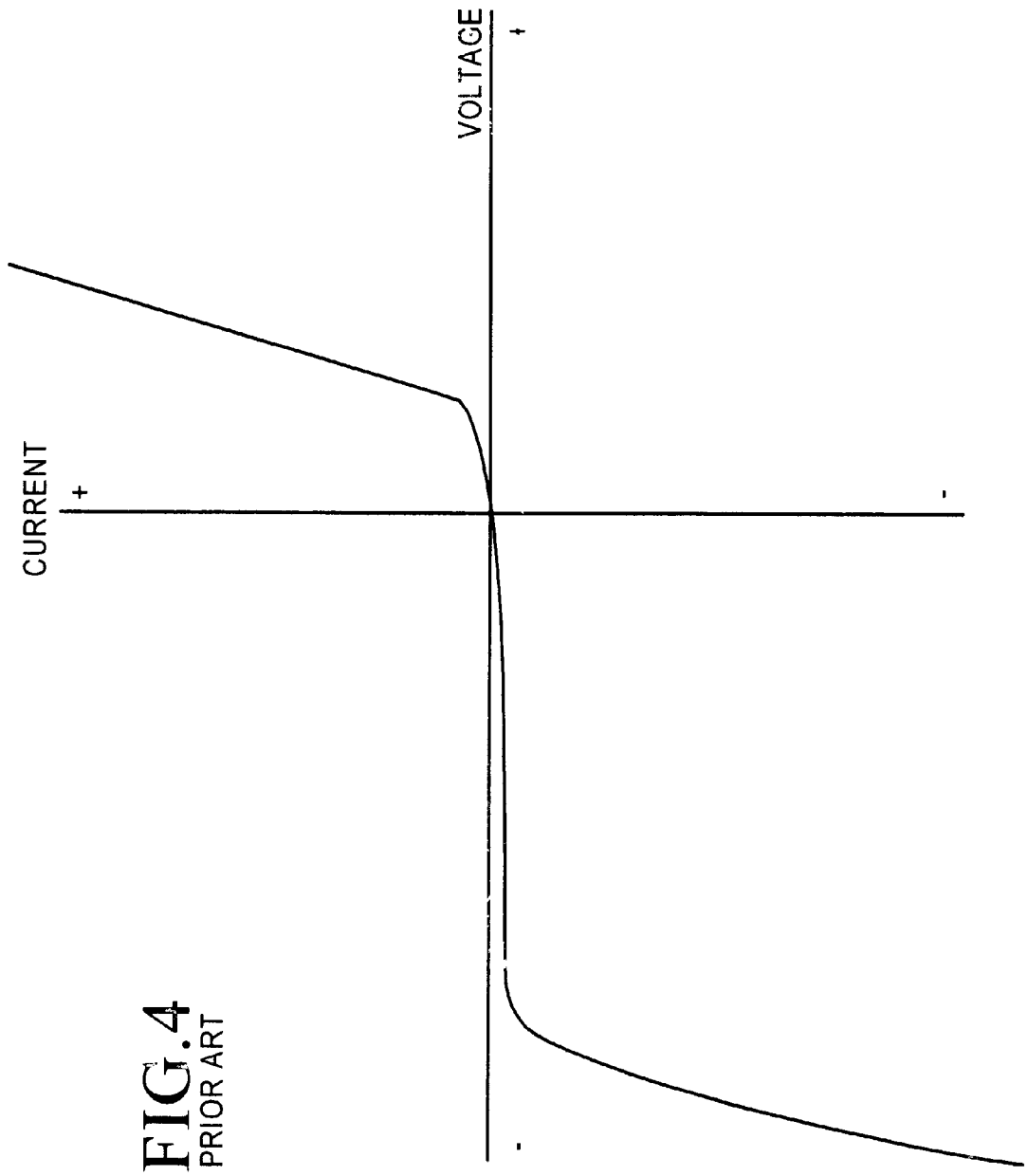
FIG. 4 is a representative diagram of the bi-directional current voltage characteristic of a voltage clamping device.

Referring to FIG. 3 there is shown a system (302) which comprises a charger and discharger (303), battery pack (304), and battery powered device load (305), in accordance with the passively protected battery pack with on load charge and on load conditioning-discharge capability where a two terminal battery (304) has a positive and negative charge terminal (306) and (307) respectively, positive and negative load terminal (317) and (318) respectively, battery cells (308) operatively coupled between the positive and negative charge terminals and the voltage clamping device, in this case, a voltage transient suppressor (309), which is similar to the FIG. 2 battery charging system (202) in that it allows the charging system (302) to be both a charger and/or a discharging conditioner. Enhanced conditioning is added within the battery charger and discharger (303) when the battery pack (304) is discharged and recharged according to a specific pre-programmed algorithm for pulse charging and a specific pre-programmed algorithm for conditioning pulse discharging.

PASSIVELY PROTECTED BATTERY PACK WITH ON DEVICE CHARGE AND CONDITIONING-DISCHARGE CAPABILITY WITH ENHANCED OPERATING CHARACTERISTICS AND CHARGING SYSTEM

Figure 5:
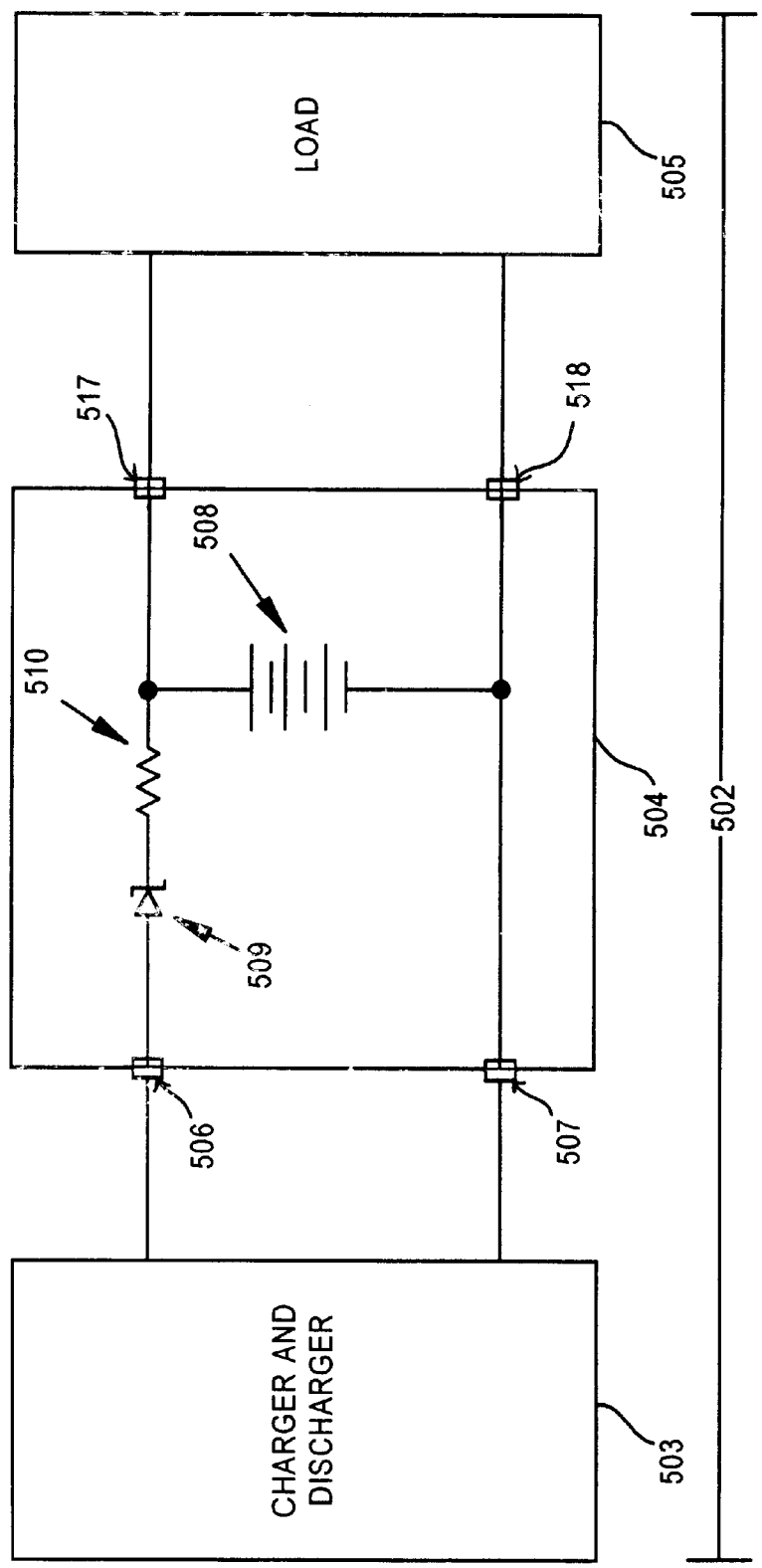
FIG. 5 is a further embodiment of the passively protected battery pack with on load charge and on load conditioning-discharge capability additionally comprising at least one resistor in the charge path of the battery to limit current flow through the voltage clamping device, in this case, a transient voltage suppressor.

Referring to FIG. 5 there is shown a system (502) which comprises a charger and discharger (503), battery pack (504), and battery powered device load (505), in accordance with the passively protected battery pack with on load charge and on load conditioning-discharge capability, where battery pack (504) has a positive and negative charge terminal (506) and (507) respectively, positive and negative load terminal (517) and (518) respectively, and battery cells (508) operatively coupled between the positive and negative charge terminals. The voltage clamping device, in this case a transient voltage suppressor, (509) operating characteristics are further enhanced by additionally comprising at least one resistor (510) in series with the voltage clamping device, in this case a transient voltage suppressor, (509) in the charge path within the battery pack (504) limits current flow through the voltage clamping device in this case a transient voltage suppressor, (509); thereby enhancing the voltage clamping device, in this case a transient voltage suppressor, (509) and enhancing its survival rate from an accidental excessively high charging current or excessively high discharging event.

Figure 6:
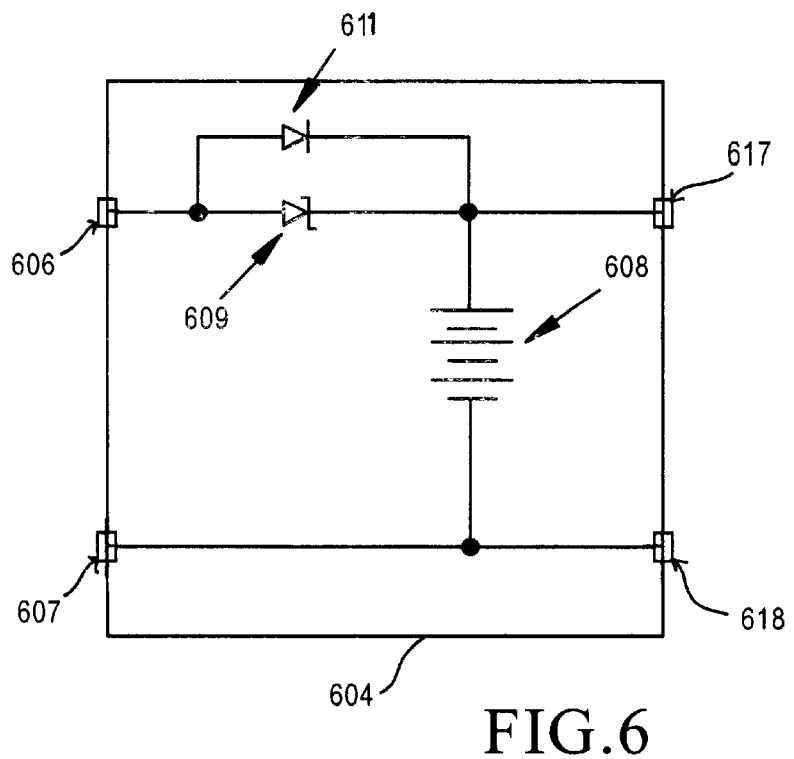
FIG. 6 is another embodiment of the passively protected battery pack with on load charge and on load conditioning-discharge capability additionally comprising at least one conventional blocking diode in parallel with the voltage clamping device, in this case, a transient voltage suppressor, in the charge path of the battery.

Referring to FIG. 6 there is shown a battery pack (604) in accordance with the passively protected battery back with on load charge and on load conditioning-discharge capability, where battery pack (604) has a positive and negative charge terminal (606) and (607) respectively, positive and negative load terminal (617) and (618) respectively, and battery cells (608) operatively coupled between the positive and negative charge terminals, where the battery pack (604) operating characteristics is further enhanced by additionally comprising at least one conventional blocking diode (611) in parallel with the voltage clamping device, in this case a transient voltage suppressor, (609) in the charge path within the battery pack (604); thereby enhancing the voltage clamping device failure in this case a transient voltage suppressor, (609) characteristic by continuing to provide a charge current path to the battery cells from the battery pack charging system in the event of an operational failure of the voltage clamping device, in this case a transient voltage suppressor, (609); thereby enhancing the useful life of the battery pack (604).

Figure 7:
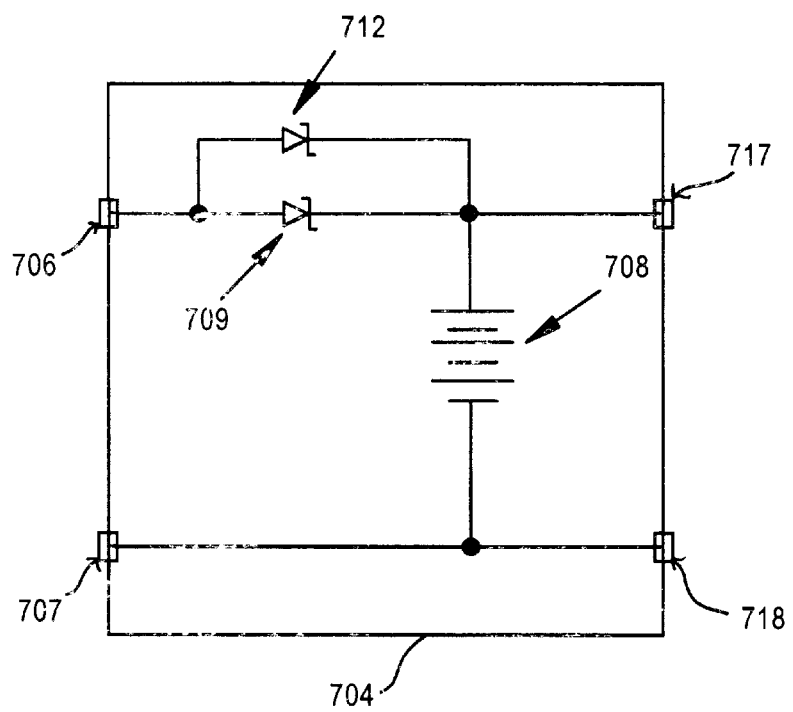
FIG. 7 is another embodiment of the passively protected battery pack with on load charge and on load conditioning-discharge capability additionally comprising at least one Schottky diode in parallel with the voltage clamping device, in this case, a transient voltage suppressor in the charge path of the battery.

Referring to FIG. 7 there is shown a battery pack (704) in accordance with the passive protected battery back with on load charge and on load conditioning-discharge capability, where battery pack (704) has a positive and negative charge terminal (706) and (707) respectively, positive and negative load terminal (717) and (718) respectively, and battery cells (708) operatively coupled between the positive and negative charge terminals, where the voltage clamping device, in this case a transient voltage suppressor, (709) operating characteristics is further enhanced by means of additionally comprising at least one Schottky diode (712) in parallel with the voltage clamping device, in this case a transient voltage suppressor, (709) in the charge path within the battery pack (704) thereby enhancing the operating useful life of the voltage clamping device. The Schottky diode (712) forward voltage characteristic is less than that of the voltage clamping device, in this case a transient voltage suppressor, (709), and therefore the charging current will flow with a preference through the Schottky diode (712); thereby reducing the forward current stress on the voltage clamping device, in this case a transient voltage suppressor, (709).

PASSIVELY PROTECTED BATTERY PACK WITH ON LOAD CHARGE AND ON LOAD CONDITIONING-DISCHARGE CAPABILITY WITH ENHANCED INTERNAL BATTERY PACK INFORMATION AND CHARGING SYSTEM

Figure 8:
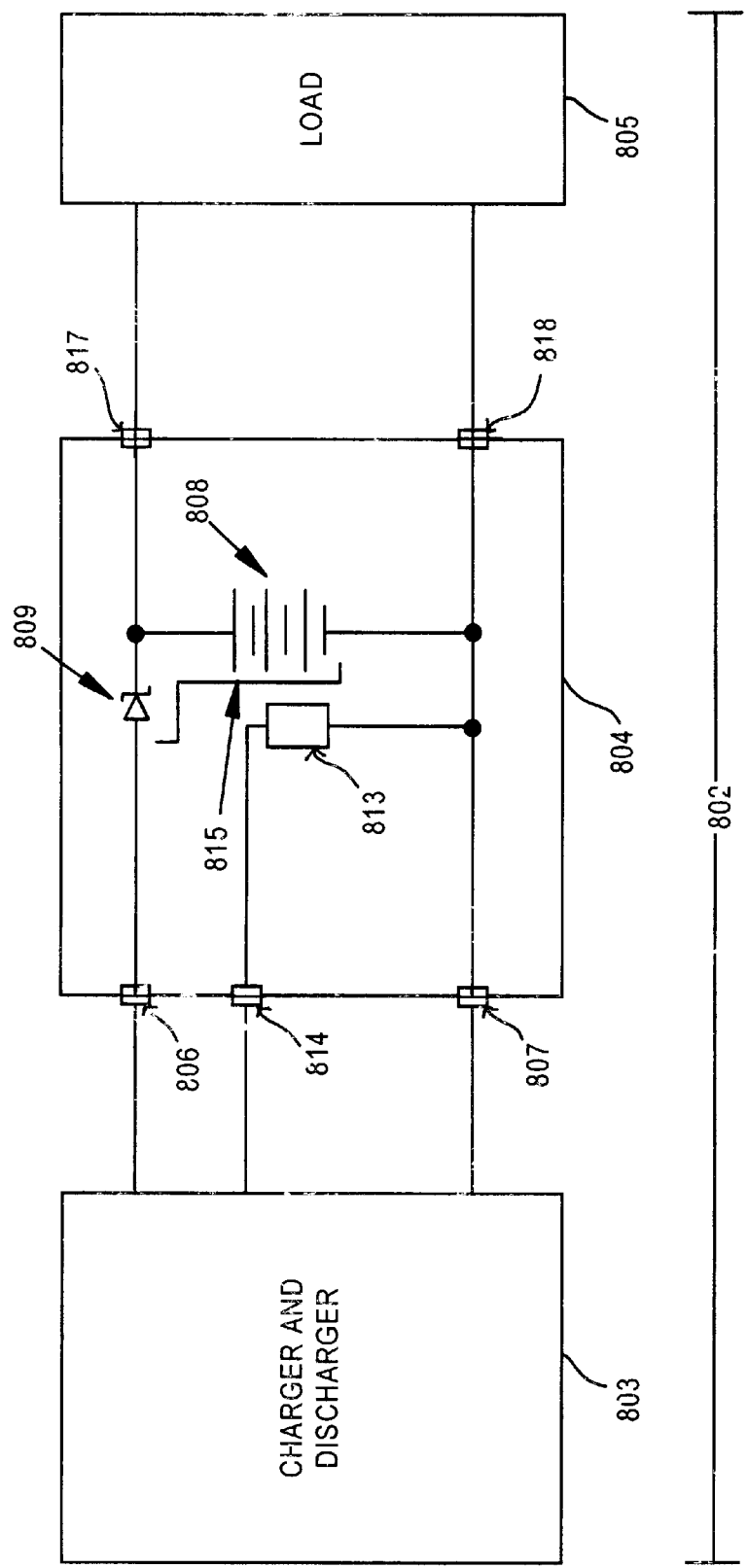
FIG. 8 is a further embodiment of the passively protected battery pack with on load charge and on load conditioning-discharge capability additionally comprising a detection means within the battery pack, for detecting a temperature within the battery pack, in this case a themistor; and a temperature detection terminal that transmits temperature information indicating the temperature detected by the temperature detection means to the charging/discharging device enhanced internal operating information.

Referring to FIG. 8, there is shown a system (802) which comprises a charger and discharger (803), battery pack (804), and battery powered device load (805), in accordance with the passive protected battery back with on load charge and on load conditioning-discharge capability where a battery pack (804) has a positive and negative charge terminal (806) and (807) respectively, positive and negative load terminal (817) and (818) respectively, and battery cells (808) operatively coupled between the positive and negative charge terminals, where operating information regarding the passive protected battery pack with on load charge and on load conditioning-discharge capability is enhanced by additionally comprising a temperature detection means, in this case, at least one thermistor (813), located within the battery pack (804), for detecting a temperature within the battery pack (804); and a temperature detection terminal (814) that transmits temperature information indicating the temperature detected by the temperature detection means to the battery charging system (802). The temperature detection means, in this case a thermistor, (813) can additionally be operatively coupled to a thermally conductive material (815) located adjacent to a plurality of battery cells (808) and voltage clamping devices, in this case a transient voltage suppressor (809), for detecting a temperature within the battery pack (804), thereby further enhancing the available battery pack information for the system (802).

Figure 9:
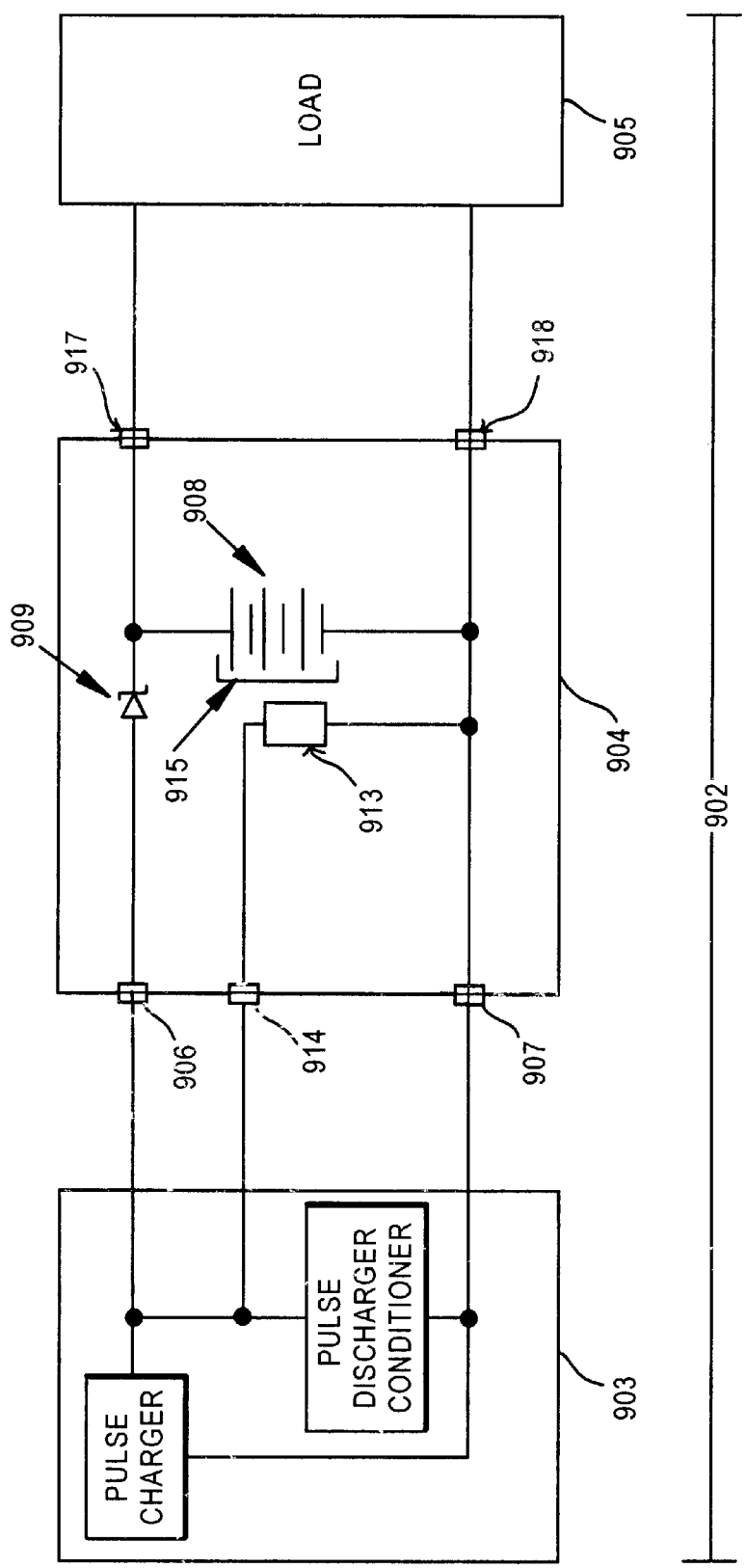
FIG. 9 is a functional block diagram of a bi-directional current control circuit which is similar to FIG. 3. However, this circuit is suitable for use in controlling the pulse charging and conditioning discharging of the passively protected battery pack with on load charge and on load conditioning-discharge capability having a temperature detection means added to the battery pack, in this case, a themistor, and a temperature detection terminal.

Referring to FIG. 9 there is shown a system (902) which comprises a charger and discharger (903), battery pack (904), and battery powered device load (905), in accordance with the passively protected battery pack with on load charge and on load conditioning-discharge capability, where battery pack (904) has a positive and negative charge terminal (906) and (907) respectively, positive and negative load terminal (917) and (918), respectively, and battery cells (908) operatively coupled between the positive and negative charge terminals, which is similar to the system in FIG. 3 (302), where the charger (903) is both a charger and/or a discharging conditioner using a pulse charging and/or conditioning-discharge algorithm. Battery pack 904 additionally comprises a temperature detection means, in this case, at least one thermistor (913), for detecting a temperature within the battery pack; and a temperature detection terminal (914) that transmit temperature information indicating the temperature detected by the temperature detection means to the pulse charging/discharging device (903). The temperature detection means, in this case a thermistor, (913) is operatively coupled to thermally conductive material (915) located adjacent to at least one battery cell (908), for detecting a temperature within the battery pack (904).

PASSIVELY PROTECTED BATTERY PACK WITH ON LOAD CHARGE AND ON LOAD CONDITIONING-DISCHARGE CAPABILITY WITH ENHANCED INTERNAL PASSIVE THERMAL PROTECTION AND BATTERY PACK INFORMATION AND CHARGING SYSTEM

Figure 10:
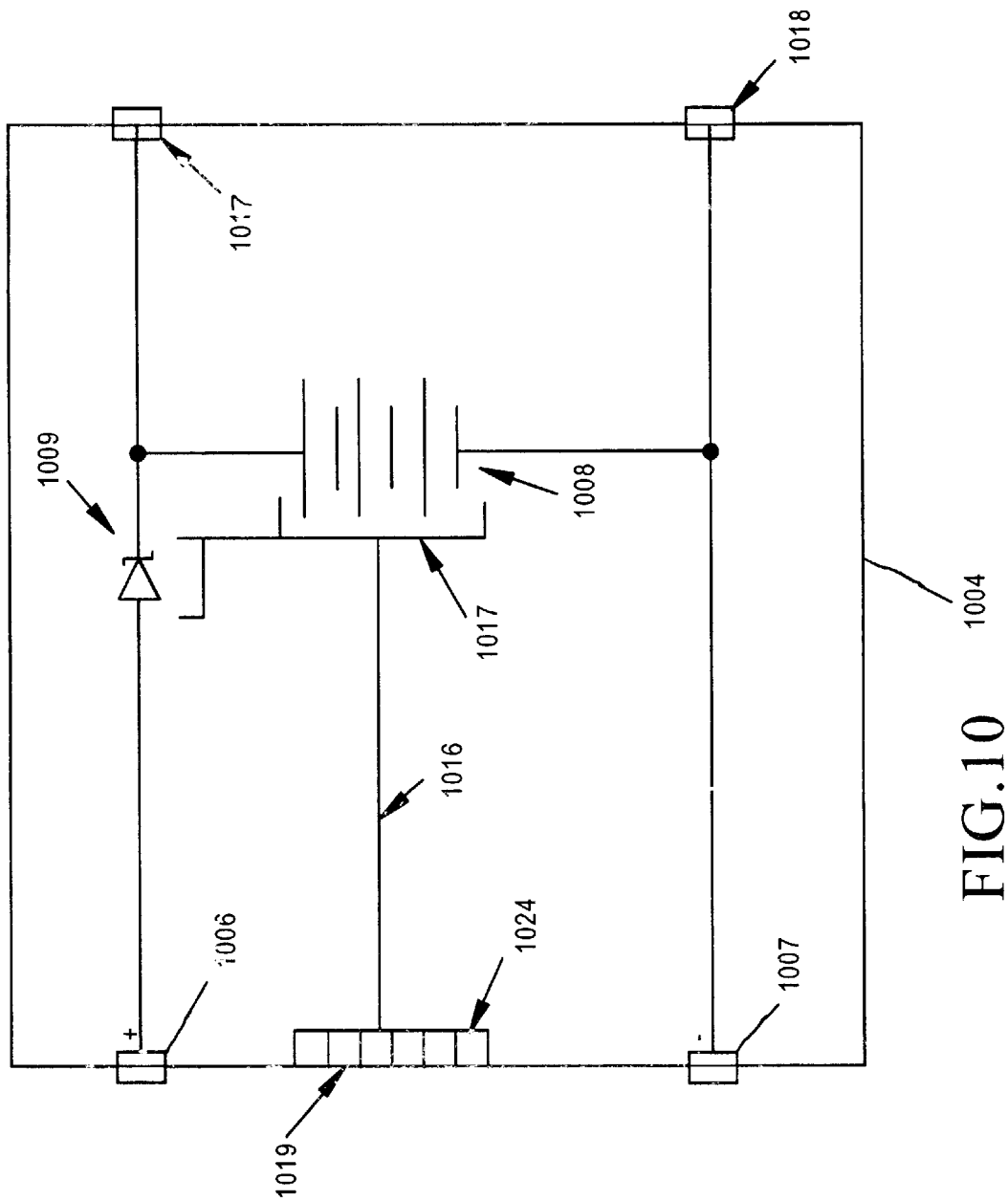
FIG. 10 is a further embodiment of the passively protected battery pack with on load charge and on load conditioning-discharge capability additionally comprising a passive thermal protection means, in this case a heat pipe, operatively coupled to the voltage clamping device, in this case, a transient voltage suppressor and a plurality of battery cells within the battery pack.

Referring to FIG. 10, there is shown a battery pack (1004) in accordance with the passive protected battery back with on load charge and on load conditioning-discharge capability, (1004), where battery pack (1004) has a positive and negative charge terminal (1006) and (1007) respectively, positive and negative load terminal (1017) and (1018) respectively, and battery cells (1008) operatively coupled between the positive and negative charge terminals, additionally comprises a passive thermal protection means, in this case, at least one heat pipe (1016); within the battery pack (1004), for passively reducing excessive heat and minimizing the temperature gradients within the battery pack (1004) which during battery pack cell charging and battery cell conditioning discharging will occur due to the self heating characteristics of the voltage clamping device, in this case a transient voltage suppressor (1009) and of the battery cells (1008), thereby enhancing the operating conditions of the voltage clamping device, in this case a transient voltage suppressor (1009) within the battery pack (1004) and thereby enhancing the overall useful life of the battery pack (1004).

In this embodiment, the heat source portion of the heat pipe (1017) is operatively coupled to the voltage clamping device (1009) and a plurality of the battery cells (1008), with the heat sink (1024) portion located at a distal location from the voltage clamping device, in this case a transient voltage suppressor (1009), in this case, at the internal side of the battery housing wall (1019) of battery pack (1004). Heat is conducted through the heat pipe (1016) from the voltage clamping device, in this case, a transient voltage suppressor, (1009) and from the battery cells (1008) to the heat sink (1024) to be radiated through the battery housing wall (1019) to the environment external to the battery pack (1004).

Figure 11:
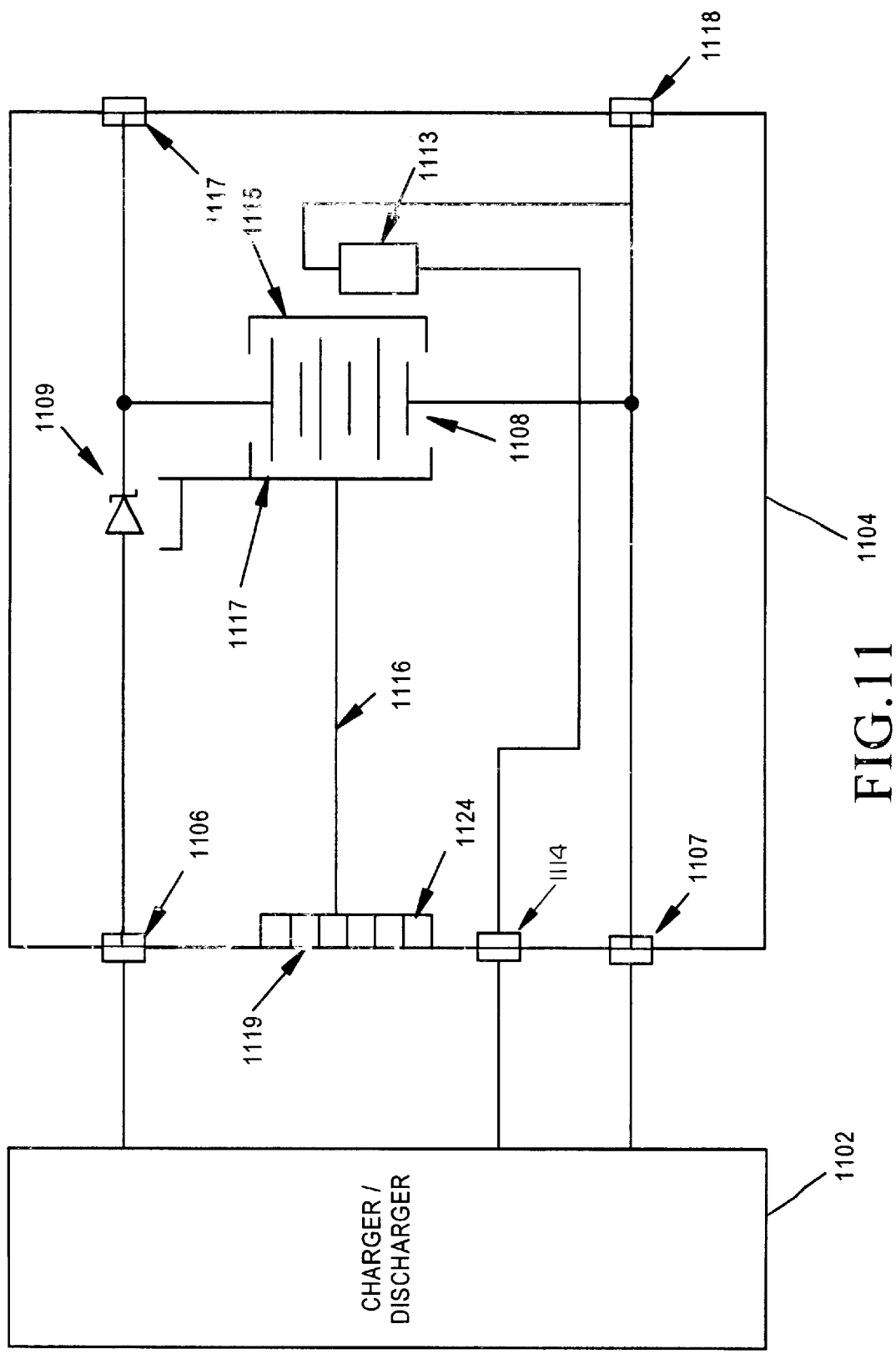
FIG. 11 is a further embodiment of the passively protected battery pack with on load charge and on load conditioning-discharge capability which is similar to FIG. 10 additionally comprising a detection means which is added within the battery pack, for detecting a temperature within the battery pack, in this case a thermistor; and a temperature detection terminal that transmits temperature information indicating the temperature detected by the temperature detection means to the charging/discharging device enhanced internal operating information.

Referring to FIG. 11 there is shown a battery pack (1104) in accordance with the passively protected battery pack with on load charge and on load conditioning-discharge capability, where battery pack (1104) has a positive and negative charge terminal (1106) and (1107) respectively, positive and negative load terminal (1117) and (1118) respectively, and battery cells (1108) operatively coupled between the positive and negative charge terminals. Similar to the battery pack in FIG. 10 (1004), battery pack (1104) additionally comprises a temperature detection means, in this case, at least one thermistor (1113), for detecting a temperature within the battery pack; and a temperature detection terminal (1114) that transmit temperature information indicating the temperature detected by the temperature detection means for the battery charging system (1102). The temperature detection means, in this case a thermistor, (1113) operatively coupled to a thermally conductive material (1115) located adjacent to the battery cells (1108), and the voltage clamping device, in this case a transient voltage suppressor (1109) where the temperature detection means, in this case a thermistor (1113) is located distal to the heat sink (1124) portion of the heat pipe (1116) and proximate to the battery pack housing wall (1119).

PASSIVELY PROTECTED BATTERY PACK WITH ON DEVICE CHARGE AND CONDITIONING-DISCHARGE CAPABILITY WITH EXTERNAL PASSIVE PROTECTION PLACEMENT

Figure 12:
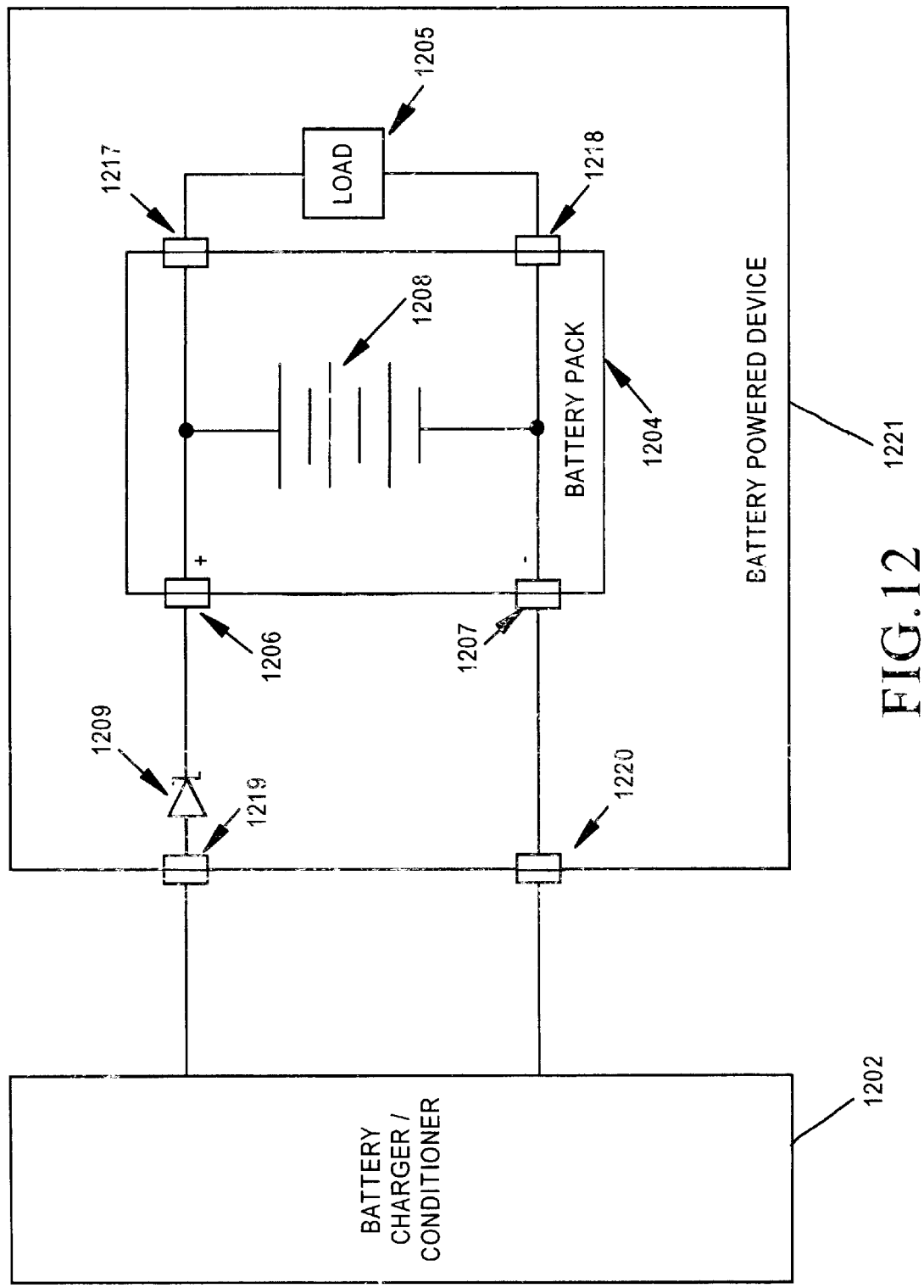
FIG. 12 is another embodiment of the passively protected battery pack with on load charge and on load conditioning-discharge capability where the battery pack with multiple sets of terminals is located within the battery powered device, with one set of terminals operatively positioned adjacent to a set of terminals located in the housing of the battery powered device, which housing terminals themselves are passively protected with a voltage clamping device, in this case, a transient voltage suppressor, which housing terminals are themselves in the charge path of the battery pack.

Referring to FIG. 12 there is shown a battery system (1202) in accordance with the passively protected battery pack with on load charge and on load conditioning-discharge capability similar to the battery system in the previous embodiments comprising at least one voltage clamping device, in this case a transient voltage suppressor (1209) in charge path of the battery cells (1208) in the battery pack (1204). In this embodiment of the passively protected battery pack with on load charge and on load conditioning-discharge capability, the battery pack (1204) has a positive and negative charge terminal (1306) and (1307), respectively, positive and negative load terminal (1217) and (1218), respectively, located within the battery powered device (1210), where one set of terminals (1206) and (1207), respectively, are operatively coupled to a set of terminals located in the housing of the battery powered device, (1219) and (1220), respectively, which are themselves passively protected with at least one voltage clamping device, in this case a transient voltage suppressor (1209) in the charge path of the battery pack (1204) and which battery housing terminals themselves (1219) and (1220), respectively, are accessible to an external power source for battery charging (1202), thereby enhancing passive protection of the battery pack located in the battery operated device at all times from a destructive short circuit. One skilled in the art can also appreciate that the voltage clamping device (1209) could be incorporated into a three terminal battery in order to provide even more information about the battery characteristics, such as temperature, if desired. The two terminal schema described by this embodiment of the passively protected battery pack with on load charge and on load conditioning-discharge capability provides the advantage of a minimum of 2 terminals with increased capability and functionality.

PASSIVELY PROTECTED BATTERY PACK WITH ON LOAD CHARGE AND ON LOAD CONDITIONING-DISCHARGE CAPABILITY CONSISTING OF A PLURALITY OF ELECTROCHEMICAL DEVICES AND CHARGING SYSTEM

Figure 13:
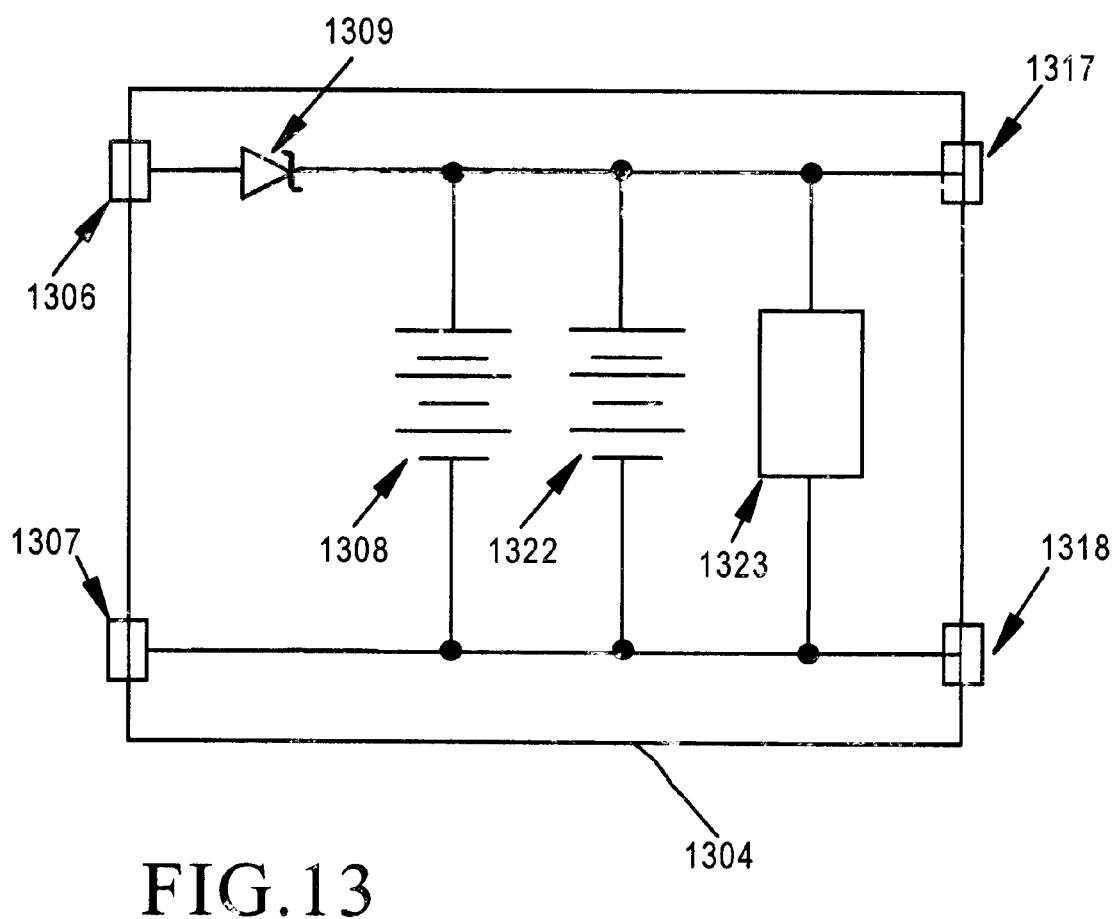
FIG. 13 is another embodiment of the passively protected battery pack with on load charge and on load conditioning-discharge capability additionally comprising a plurality of electrochemical devices in this case, consisting of two rechargeable battery cells and one capacitor.

Referring to FIG. 13 there is shown a battery pack (1304) in accordance with the passively protected battery pack with on load charge and on load conditioning-discharge capability similar to the battery packs in the previous embodiments comprising at least one voltage clamping device, in this case a transient voltage suppressor (1309) in the charge path of the battery pack (1304), has a positive and negative charge terminal (1306) and (1307) respectively, positive and negative load terminal (1317) and (1318) respectively, additionally comprising a plurality of electrochemical devices, in this case two battery cells, (1308) and (1322), respectively and a capacitor (1323), while providing a passively protected battery pack (1304) with on load charge and on load conditioning-discharge capability. The voltage clamping device, in this case a transient voltage suppressor, (1309) prevents the short circuit of the battery pack terminals (1306) and (1307) respectively, when the battery pack (1304) is connected to the load, or when the battery is removed from the load, the battery pack terminals, (1306) and 1307) respectively, are always protected from a destructive short circuit. One skilled in the art can also appreciate that the voltage clamping device could be incorporated into a three terminal battery in order to provide even more information about the battery characteristics, such as temperature, if desired. The two terminal schema described by the embodiment of the passively protected battery pack with on load charge and on load conditioning-discharge capability provides the advantage of a minimum of 2 terminals with increased capability and functionality.

Accordingly, improved battery pack protection has been provided, which can be incorporated into a charging system with a minimum number of 2 terminals. Additional advantages and modifications will readily occur to those skilled in the art. Therefore, while the passively protected battery pack with on load charge and on load conditioning-discharge capability has been described in connection with what is presently considered to be the most practical and preferred embodiments, it is to be understood that the passively protected battery pack with on load charge and on load conditioning-discharge capability is not to be limited to the disclosed embodiments, but on the contrary, is intended to cover various modifications and equivalent arrangements included within the spirit and scope of the appended claims.

We claim:

1. A passively protected battery pack with on load charge and on load conditioning-discharge capability, comprising:
positive and negative charge terminals;
one battery cell operatively coupled between the positive and negative charge terminals; and
one voltage clamping device having a reverse voltage breakdown threshold operatively coupled for conducting current to and discharging current from the battery cell and within the charge path of the battery cell, wherein the voltage clamping device provides passive protection for the battery pack by preventing a reverse current flow in the event of a short circuit of the charge terminals, wherein further the voltage clamping device allows on load conditioning discharge capability when a negative voltage higher than the reverse voltage breakdown threshold is applied; and wherein further the battery pack is adapted to be charged and discharged using the positive and negative terminals while the battery pack is operably connected to a load.

2. A passively protected battery pack with on load charge and on load conditioning-discharge capability as claimed in claim 1 wherein one Schottky Diode operatively coupled for conducting current to the battery cell is used in parallel with the voltage clamping device.

3. A passively protected battery pack with on load charge and on load conditioning-discharge capability as claimed in claim 1 wherein one conventional blocking diode operatively coupled for conducting current to the battery cell is used in parallel with the voltage clamping device.

4. A passively protected battery pack with on load charge and on load conditioning-discharge capability as claimed in claim 1 wherein one resistor operatively coupled in series with one voltage clamping device coupled for conducting current to and discharging current from the battery cell.

5. A passively protected battery pack with on load charge and on load conditioning-discharge capability as claimed in claim 1 further comprising a temperature detection means within the battery pack for detecting temperature and a temperature detection terminal that transmits temperature information indicating the temperature detected by temperature detection means to a charging/discharging device which provides a means for interrupting the charging or conditioning discharging of the battery pack when the temperature information transmitted through the temperature detection terminal on the battery pack exceeds the baseline battery pack temperature criteria.

6. A passively protected battery pack with on load charge and on load conditioning-discharge capability as claimed in claim 5 wherein the temperature detection means is operatively coupled to a thermally conductive material which is operatively coupled to a battery cell in the battery pack and the voltage clamping device for detecting a substantially average temperature within the battery pack.

7. A passively protected battery pack with on load charge and on load conditioning-discharge capability as claimed in claim 1, further comprising a passive temperature protection means is operatively coupled to the battery cell and the voltage clamping device in the battery pack.

8. A passively protected battery pack with on load charge and on load conditioning-discharge capability as claimed in claim 1, further comprising one voltage clamping device in the charge path of the battery pack located outside the battery pack for conducting current to and discharging current from the battery pack.

9. A passively protected battery pack with on load charge and on load conditioning-discharge capability as claimed in claim 1, further comprising one electrochemical device.

10. A passively protected battery pack with on load charge and on load conditioning-discharge capability, comprising:
positive and negative charge terminals;
more than one battery cell operatively coupled between the positive and negative charge terminals in one string of battery cells, wherein the more than one battery cells are operatively coupled between the positive and negative charge terminals, wherein the more than one battery cells are adapted to be charged using a combination of pulse charging and pulse discharging; and
at least one voltage clamping device having a reverse voltage breakdown threshold operatively coupled for conducting current to and discharging current from the battery cells and within the charge path of the battery cells, wherein the voltage clamping device provides passive protection for the battery pack by preventing a reverse current flow in the event of a short circuit of the charge terminals, wherein further the voltage clamping service allows on load conditioning discharge capability when a negative voltage higher than the reverse voltage breakdown threshold is applied, and wherein further the battery pack is adapted to be charged and discharged using the positive and negative terminals while the battery pack is operably connected to a load.

11. A passively protected battery pack with on load charge and on load conditioning-discharge capability as claimed in claim 10 further comprising at least one Schottky Diode operatively coupled for conducting current to the battery cells is used in parallel with the voltage clamping device.

12. A passively protected battery pack with on load charge and on load conditioning-discharge capability as claimed in claim 10 further comprising at least one conventional blocking diode operatively coupled for conducting current to the battery cells is used in parallel with the voltage clamping device.

13. A passively protected battery pack with on load charge and on load conditioning-discharge capability as claimed in claim 10 further comprising at least one resistor operatively coupled in series with at least one voltage clamping device coupled for conducting current to and discharging current from the battery cells.

14. A passively protected battery pack with on load charge and on load conditioning-discharge capability as claimed in claim 10 further comprising a temperature detection means within the battery pack for detecting temperature and a temperature detection terminal that transmits temperature information indicating the temperature detected by temperature detection means to a charging/discharging device which provides a means for interrupting the charging or conditioning discharging of the battery pack when the temperature information transmitted through the temperature detection terminal on the battery pack exceeds the baseline battery pack temperature criteria.

15. A passively protected battery pack with on load charge and on load conditioning-discharge capability as claimed in claim 14 wherein the temperature detection means is operatively coupled to a thermally conductive material which is operatively coupled to each of the battery cells in the battery pack and the at least one voltage clamping device for detecting a substantially average temperature within the battery pack.

16. A passively protected battery pack with on load charge and on load conditioning-discharge capability as claimed in claim 10, further comprising a passive temperature protection means is operatively coupled to a plurality of the battery cells and voltage clamping devices in the battery pack.

17. A passively protected battery pack with on load charge and on load conditioning-discharge capability as claimed in claim 10, further comprising at least one voltage clamping device in the charge path of the battery pack located outside the battery pack for conducting current to and discharging current from the battery pack.

18. A passively protected battery pack with on load charge and on load conditioning-discharge capability as claimed in claim 10, further comprising more than one battery cell operatively coupled between the positive and negative charge terminals in more than one string of battery cells.

19. A passively protected battery pack with on load charge and on load conditioning-discharge capability as claimed in claim 10, further comprising at least one electrochemical device operatively coupled between the positive and negative charge terminals in at least one string of electrochemical devices.

20. A passively protected battery pack with on load charge and on load conditioning-discharge capability, comprising:
   positive and negative charge terminals;
   more than one battery cell operatively coupled between the positive and negative charge terminals in more than one parallel string of battery cells; and
   at least one voltage clamping device having a reverse voltage breakdown threshold operatively coupled to each parallel string of battery cells in a battery pack for conducting current to and discharging current from the battery cells and within the charge path of the battery cells, wherein the at least one voltage clamping device provides passive protection for the battery pack by preventing a reverse current flow in the event of a short circuit of the charge terminals, and wherein further the voltage clamping device allows on load conditioning discharge capability when a negative voltage higher than the reverse voltage breakdown threshold is applied.

21. A passively protected battery pack with on load charge and on load conditioning-discharge capability as claimed in claim 20 further comprising at least one Schottky Diode operatively coupled for conducting current to the battery cells in used in parallel with at least one voltage clamping device.

22. A passively protected battery pack with on load charge and on load conditioning-discharge capability as claimed in claim 20 further comprising at least one conventional blocking diode operatively coupled for conducting current to the battery cells is used in parallel with at least one voltage clamping device.

23. A passively protected battery pack with on load charge and on load conditioning-discharge capability as claimed in claim 20 further comprising at least one resistor operatively coupled in series with at least one voltage clamping device coupled for conducting current to and discharging current from the battery cells.

24. A passively protected battery pack with on load charge and on load conditioning-discharge capability as claimed in claim 20 further comprising a temperature detection means within the battery pack for detecting temperature and a temperature detection terminal that transmits temperature information indicating the temperature detected by temperature detection means to a charging/discharging device and which provides a means for interrupting the charging or conditioning discharging of the battery pack when the temperature information transmitted through the temperature detection terminal on the battery pack exceeds the baseline battery pack temperature criteria.

25. A passively protected battery pack with on load charge and on load conditioning-discharge capability as claimed in claim 24 wherein the temperature detection means is operatively coupled to a thermally conductive material which is operatively coupled to a plurality of battery cells in the battery pack and the at least one voltage clamping device for detecting a substantially average temperature within the battery pack.

26. A passively protected battery pack with on load charge and on load conditioning-discharge capability as claimed in claim 20, further comprising a passive temperature protection means operatively coupled to the battery cells and the voltage clamping device in the battery pack.

27. A passively protected battery pack with on load charge and on load conditioning-discharge capability as claimed in claim 20, further comprising at least one voltage clamping device in the charge path of the battery pack located outside the battery pack for conducting current to and discharging current from the battery pack.

28. A passively protected battery pack with on load charge and on load conditioning-discharge capability as claimed in claim 20, further comprising at least one electrochemical device operatively coupled between the positive and negative charge terminals in at least one string of electrochemical devices.

29. A passively protected battery pack with on load charge and on load conditioning-discharge capability, comprising:
   positive and negative charge terminals;
   one battery cell; and
   one voltage clamping device in the charge path of the battery pack located outside the battery pack operatively coupled for conducting current to and discharging current from the battery pack, wherein the voltage clamping device is a transient voltage suppressor.

30. A passively protected battery pack with on load charge and on load conditioning-discharge capability, comprising:
   positive and negative charge terminals;
   more than one battery cell operatively coupled between the positive and negative charge terminals in one string of battery cells; and at least one voltage clamping device in the charge path of the battery pack located outside the battery pack operatively coupled for conducting current to and discharging current from the battery pack, wherein the voltage clamping device is a transient voltage suppressor.

31. A passively protected battery pack with on load charge and on load conditioning-discharge capability, comprising:
   positive and negative charge terminals;
   more than one battery cell operatively coupled between the positive and negative charge terminals in more than one parallel string of battery cells; and
   at least one voltage clamping device in the charge path of the battery pack located outside the battery pack operatively coupled for conducting current to and discharging current from the battery pack, wherein the voltage clamping device is a transient voltage suppressor.

32. A passively protected battery pack with on load charge and on load conditioning-discharge capability as claimed in claims 29, 30, or 31, further comprising at least one Schottky Diode operatively coupled for conducting current to the battery cells is used in parallel with the voltage clamping device.

33. A passively protected battery pack with on load charge and on load conditioning-discharge capability as claimed in claims 29, 30, or 31, further comprising at least one conventional blocking diode operatively coupled for conducting current to the battery cells is used in parallel with the voltage clamping device.

34. A passively protected battery pack with on load charge and on load conditioning-discharge capability as claimed in claims 29, 30, or 31, further comprising at least one resistor operatively coupled in series with the voltage clamping device coupled for conducting current to and discharging current from the battery cells.

35. A battery charging system, comprising:
   A passively protected battery pack with on load charge and on load conditioning-discharge capability, comprising:
      positive and negative charge terminals;
      one or more battery cells operatively coupled between the positive and negative charge terminals; and
      a voltage clamping device having a reverse voltage breakdown threshold for conducting current to and discharging current from the one or more battery cells and within the charge path of the battery cells, wherein the voltage clamping device provides passive protection for the battery pack by preventing a reverse current flow in the event of a short circuit of the charge terminals, and wherein further the voltage clamping device allows on load conditioning discharge capability when a negative voltage higher that the reverse voltage breakdown threshold is applied; and
   A charger, comprising:
      positive and negative charging terminals for mating respectively with the positive and negative charge terminals of the battery pack;
      a negative voltage power source having a negative voltage potential, wherein the negative voltage potential is larger than the reverse voltage breakdown threshold;
      a charging control circuit for charging the battery pack through the positive charging terminal, wherein the charging control circuit charges the one or more battery cells using pulse charging; and
      a discharging control circuit for discharging the battery pack through the positive charging terminal, wherein the discharging control circuit discharges the one or more battery cells using pulse discharging.

36. A battery charging system as claimed in claim 35, wherein the charger monitors the battery pack voltage, charges the battery pack and determines when the battery pack is substantially fully charged.

37. A battery charging system as claimed in claim 35 wherein the charger conditions the battery in conjunction with charging the battery pack.

38. A battery charging system as claimed in claim 35, wherein the charger monitors the battery pack voltage, pulse charges the battery pack and determines when the battery pack is substantially fully charged.

39. A battery charging system as claimed in claim 35, wherein the charger monitors the battery pack voltage, pulse charges the battery pack and determines when the battery pack is substantially fully charged and discharges the battery for battery cell conditioning.

40. A battery charging system as claimed in claim 35, wherein the charger monitors the battery pack voltage, pulse charges and pulse discharges the battery pack and determines when the battery pack is substantially fully charged.

41. A battery charging system, comprising:
   A passively protected battery pack with on load charge and on load conditioning-discharge capability, comprising:
      positive and negative charge terminals;
      one or more battery cells operatively coupled between the positive and negative charge terminals; and
      a voltage clamping device having a reverse voltage breakdown threshold for conducting current to and discharging current from the one or more battery cells and within the charge path of the battery cells, wherein the voltage clamping device provides passive protection for the battery pack by preventing a reverse current flow in the event of a short circuit of the charge terminals, and wherein further the voltage clamping device allows on load conditioning discharge capability when a negative voltage higher than the reverse voltage breakdown threshold is applied; and
   A charger, comprising:
      positive and negative charging terminals for mating respectively with the positive and negative charge terminals of the battery pack;
      a negative voltage power source having a negative voltage potential, wherein the negative voltage potential is larger than the reverse voltage breakdown threshold;
      a charging control circuit for charging the battery pack through the positive charging terminal, wherein the charging control circuit charges the one or more battery cells using pulse charging; and
      a discharging control circuit for discharging the battery pack through the positive charging terminal, wherein the discharging control circuit discharges the one or more battery cells using pulse discharging; and
      a means for interrupting the charging or conditioning discharging of the battery pack when the temperature information transmitted through the temperature detection terminal on the battery pack exceeds the baseline battery pack temperature criteria.

42. A battery charging system as claimed in claim 41, wherein the charger monitors the battery pack voltage, charges the battery pack and determines when the battery pack is substantially fully charged.

43. A battery charging system as claimed in claim 41 wherein the charger conditions the battery in conjunction with charging the battery pack.

44. A battery charging system as claimed in claim 41, wherein the charger monitors the battery pack voltage, pulse charges the battery pack and determines when the battery pack is substantially fully charged.

45. A battery charging system as claimed in claim 41, wherein the charger monitors the battery pack voltage, pulse charges the battery pack and determines when the battery pack is substantially fully charged and discharges the battery for battery cell conditioning.

46. A battery charging system as claimed in claim 41, wherein the charger monitors the battery pack voltage, pulse charges and pulse discharges the battery pack and determines when the battery pack is substantially fully charged.

* * * * *